Nov. 29, 1966    H. FUNFSTUCK    3,289,105
TEMPERATURE COMPENSATED TRANSISTOR INVERTER
Filed Jan. 27, 1964    2 Sheets-Sheet 1

HORST FUNFSTUCK
INVENTOR.

BY *Philip Subkow*

ATTORNEY

3,289,105
TEMPERATURE COMPENSATED TRANSISTOR INVERTER

Horst Funfstuck, Los Angeles, Calif., assignor to Statham Instruments, Inc., Los Angeles, Calif., a corporation of California
Filed Jan. 27, 1964, Ser. No. 340,323
14 Claims. (Cl. 331—113)

This invention relates to a transistorized saturated core, D.C. to A.C. inverter. Particularly, it relates to an inverter in which low voltage D.C. current is inverted to form an alternating current which can be transformed to the desired voltage level. The rectification of the alternating current can be obtained and filtered to produce a direct current of desired magnitude, resulting in a D.C. to D.C. converter.

The A.C. generator in the system of my invention includes a saturable core transformer, such as the toroidal or DU-lamination type, connected to transistors arranged in push-pull configuration. The collectors of the transistors are connected to the saturable core transformer. An output secondary is provided and a control secondary is also provided. The transistors are driven to saturation by the supply D.C. applied to the bases of the transistors, on which D.C. there is super-imposed the control A.C. from the control secondary, which acts as a switching circuit. The control A.C. modulates the D.C. applied to the bases, so that on one half of the control A.C. cycle the positive D.C. potential at the base of one of the transistors is slightly increased so that the transistor is maintained in the forward biased saturated condition, and is "on," while the other transistor of the push-pull pair has its positive bias reduced to a negative bias by the control A.C. The transistor is thus, back biased into the "off" condition.

This causes a current flow from the D.C. source through the primary of the transformer and the transistor which is in the "on" condition. This flow causes a rise in magnetizing current in the transformer until the transformer core becomes magnetically saturated. The voltage across the transformer primary rises steeply until the transformer core becomes saturated and ideally becomes equal to the D.C. supply voltage. When saturation occurs, flux variation in the transformer ceases and the transformer voltage falls to zero. This also results in the reduction in the potential across the control A.C. winding. The reduction of the transformer voltage, because of the stored energy in the transformer, reverses and causes a reversal of voltage in the control coil. This reversal results in the reversal of the bias in the base of the transistors so that the "on" transistor becomes reverse biased and the "off" transistor returns to the forward biased saturated condition. The conductive path through the primary of the transformer is now established through the transistor which now has become forward biased, and the cycle is re-established.

It is a characteristic of the circuit of my invention that a constant D.C. bias is established at the bases of each of the transistors, which, even in the absence of the control A.C., is selected to be sufficient to drive each of the transistors to saturation. The control A.C. reverses the bias on one of the transistors, while the other transistor is maintained in the forward biased saturated condition. The result of this switching is a square-wave function at all windings of the transformer, which may be utilized in any manner, as for instance, it may be rectified and filtered to produce a D.C. voltage at the power level desired. By controlling the magnitude of the D.C. current supplied to the bases, I may obtain the desired output collector current from the transistors, giving effect to the beta of the transistors, thereby obtain the desired current or power output from the transformer secondary.

Since the $h_{FE(SAT)}$ i.e., beta of the transistors, is a function of the temperature, and decreases with decrease in temperature, and both the collector to emitter voltage at saturation $V_{CE(SAT)}$, and the base to emitter voltage at saturation $V_{BE(SAT)}$, increase with decrease in temperature, the current demand at the transistor base for forward bias increases in order to maintain the desired collector saturation current. For this purpose, I provide means for increasing the D.C. current to the base of the transistor. This is made possible by employing the D.C. source potential at the base of the transistor, of such magnitude as to insure that there will be sufficient D.C. current at the base to drive the transistors to saturation. The higher current required at low temperatures to saturate transistors at the base of the transistors, may thereby be provided.

The magnitude of the A.C. control signal required in my circuit, is but a fraction of the D.C. supply. The drive current to the base of the transistors is the D.C. current on which is superimposed the A.C. control circuit current, so as to raise the positive value at the base of one of the transistors to maintain it in the "on" condition, and to reduce the positive value to a negative bias on the other transistor, and thus, place the transistor into the "off" condition.

This invention will be further described by reference to the drawings in which.

Figure 1:
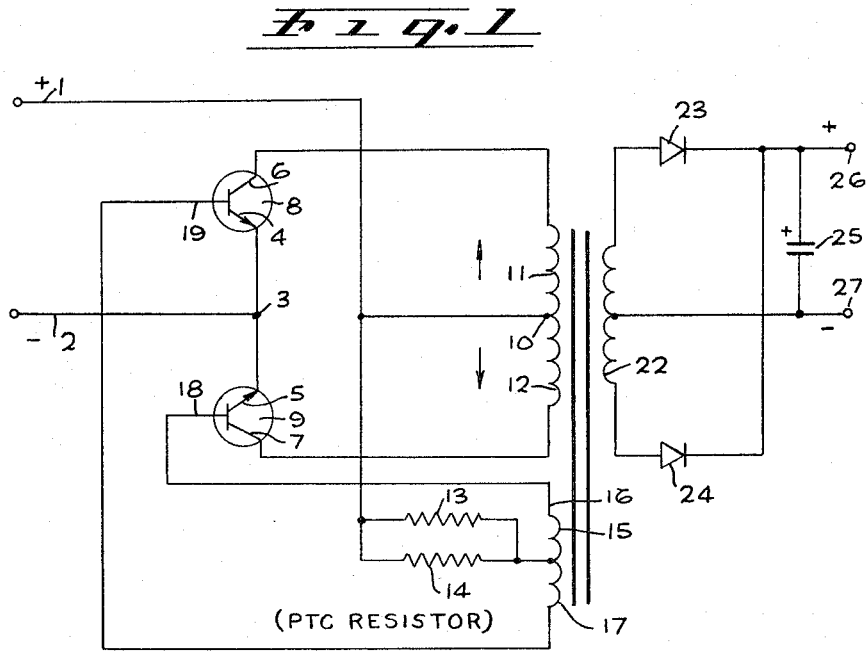
FIG. 1 is a schematic wiring diagram of my invention.
Figure 2:
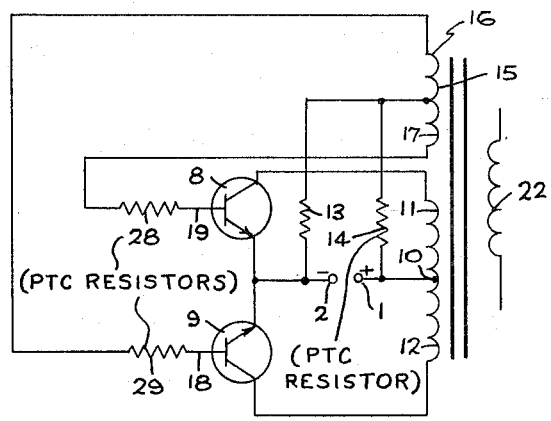
FIGS. 2 and 3 are a schematic wiring diagram of modifications of my invention.

The D.C. source potential shown in FIGS. 1 and 2, is shown with a positive pole at 1, and a negative pole at 2. The positive is connected to the mid-point of the transformer primary 10. The primary is connected to the collector 6 of the NPN transistor 8, and the collector 7 of the NPN transistor 9. The positive terminal 1 is also connected through the resistors 13 and 14, to the mid-point of the secondary 15. The secondary 15 is also connected to the base 18 of the transistor 9, and the base 19 of the transistor 8. The output secondary 22 is connected through a rectifier composed of the diodes 23 and 24, and if required, a ripple suppressor condenser 25, to the terminals 26 and 27. As will be seen, a positive D.C. current is established at the bases 19 and 18 through the resistors 13 and 14, and the winding 16 and 17, of the secondary 15. Unless required for the reasons stated below, 13 and 14 may be combined in one resistor.

The magnitude of the resistors 13 and 14, is such that, acting with the D.C. resistance of the transformer coils 16 and 17, the available potential at 1, causes sufficient base current to saturate the transistors 8 and 9. The bases of the transistors are in series with the resistors 13 and 14, the winding 16 and 17 of the secondary 15, and the positive of the D.C. source.

The system is designed so that the collector circuits are not entirely symmetrical. Unless the internal D.C. resistance in the collector-to-emitter circuits, and the external resistance in series with each of the collectors are perfectly identical, i.e., the transistor circuits are symmetrical, there will be a net current flow in the transformer primary. In order to assure this effect, and not to rely on accidental mis-match of transistors or external resistances, I make the D.C. resistance of the transformer section 12, greater than 11 or vice versa.

The transistor circuit is thus unsymmetrical. The impedance in the current path through the collector 7 is greater than through collector 6. This results in a $dI/dt \times R$ transient through the primary 10 when the D.C. currents, at the bases 19 and 18, are both sufficient to saturate each of the transistors.

The above transient induces a voltage in the control secondary winding 15, which modulates the D.C. applied to the bases 18 and 19 of the transistors 8 and 9. Thus, it may, for example, add to the positive at the base 18 of transistor 9, and subtract from the positive at the base 19 of transistor 8. The transistor 9 is thus maintained in the saturated condition while the transistor 8 becomes reverse biased. The current flow from the positive pole 1 is then through the primary 10 and the transistor 9 to the negative, or other reference potential indicated at minus at 2. When the core becomes saturated, the flux change becomes substantially zero, and the voltage (A.C.) across the transformer primary 10 falls to zero. The A.C. voltage across the control secondary 15, also drops to zero, and the D.C. supply is again established at bases 18 and 19. Both the transistors 8 and 9 are brought to the forward biased condition. However, substantially simultaneously, depending on the switching times of the circuit, the collapse of the voltage across the transformer primary 10 has induced a reverse polarity at the primary resulting from the collapse of the magnetic field in the core. A reverse potential induced in 15 is applied as a control potential to 18 and 19. The positive potential in the base 19 is maintained to hold the transistor 8 in saturated condition, and the control potential at the base 18 subtracts from the positive D.C. at the base 18 to place the transistor 9 in the back biased or "off" condition. The D.C. current flow through the transistor 8, thus induces a change in the magnetic field to cause a voltage in the control secondary 15, which is in the direction to hold the transistor 8 in the saturated condition and the transistor 9, in a non-conductive, i.e., "off" condition. This continues until the transformer core becomes saturated and the magnetic field collapses, as described above, completing the cycle.

The induced A.C. in 22 is rectified by the diodes 23 and 24, and ripple may be suppressed by the condenser 25, and the rectified D.C. appears at 26 and 27.

It will be recognized, that whereas for purposes of explanation, the reversal of the polarity of the potential and the magnetic field is stated to occur at the saturation of the core of the transformer, this effect may occur at some value of the magnetic field less than saturation, depending on the conditions which introduce a limit to the magnetizing current through the primary. Thus, when the magnitude of the magnetizing current has reached its limit, the increase in the flux in the core has reached its limit and cannot further increase, this will have the same effect as would saturation of the core.

The resistors 13 and 14, if used alone, function together with any other D.C. resistance, i.e., that of the control secondary windings 16 and 17, to establish the D.C. bias at the bases 18 and 19. This is designed to be in magnitude sufficient to provide the base current, which, in the absence of any A.C. from the control coil 15, is sufficient to forward bias, both transistors to saturation. Additionally, if the collector current is required to supply a given current at 26 and 27, the current flow to the base must be sufficient, giving consideration to the beta of the transistors, to provide the collector current demand.

Thus, by way of example only, and not as a limitation of my invention, if the collector current is to be 30 milliamperes and the beta is 10, then the base current should be substantially 3 milliamperes. With a supply voltage of 28 volts at 1 and 2, and ignoring the resistance of the control coil 15 and the leads, the resistors 13 and 14 should have a combined resistance value of about 10K sufficient to establish 3 milliamperes at the bases of the transistor.

The A.C. control voltage, peak to peak, should be sufficient to remove this positive potential. Thus, for example, if the peak to peak potential at the control secondary is 6 volts, i.e., 3 volts between the center tap, and the ends of the windings 16 and 17, the base to emitter bias at 8 may go positive 1 volt, and the base to emitter bias at 9 will go negative 5 volts. On the reverse negative half cycle, the condition of the transistors are reversed. If this system is exposed to large ambient temperature changes, the characteristics of the transistors change as stated above, and in order to maintain the collector current, for example, the 30 milliamps as given in the above example, the base current and the base potential must change in the proper direction and magnitude.

Thus, when the system is subjected to low temperature, the value of the $V_{BE(SAT)}$ increases roughly at the rate of about 2 to 3 millivolts per degree centigrade. The value of $h_{FE(SAT)}$ i.e., beta of the transistors decreases with decrease in temperature. The $V_{BE(SAT)}$ increases with decrease in temperature. If the variation in $h_{FE(SAT)}$ as a function of temperature were not significant, the effect of temperature on the $V_{BE(SAT)}$ and the $V_{CE(SAT)}$ may be minimized by making the D.C. voltage at 1–2 large enough so that the above parameter variations are but a small fraction of the available D.C. The type of resistor which has a resistance that does not change with temperature and which has a resistance of a magnitude sufficient to supply the required current at the base circuit, sometimes may be adequate for the resistors 13 and 14. For example, if the ambient temperature does not change very much, the type of resistor which is not temperature sensitive may be employed either at room temperature or at cryogenic temperatures of, for example, −300° Fahrenheit or lower. The same resistor may not be employed at such extremes. However, two different resistors may be so employed, one at one temperature and one at the other. In either case the resistor need not be temperature sensitive. Further, in either case this type of resistor can have a resistance value necessary to supply the required base current. When the variation of $h_{FE(SAT)}$ is great, this procedure is not practical, for the efficiency of the system will then decrease excessively. If a resistor is used that has a resistance suitable for operation at cryogenic temperatures, it will create a much larger collector current capability than is required at ambient temperatures, for example, 75° Fahrenheit. The current flow in the collector circuit will depend upon the current demand in the system. The system will thus be very inefficient at temperatures higher than the chosen low temperature, for example, at ambient room temperature 75° Fahrenheit.

The efficiency is, however, greatly improved, and the collector current maintained substantially constant over wide ranges of temperature from cryogenic temperatures, for example, from −300° F. to temperatures much above room temperature, for example, +300° Fahrenheit, by modifying the base current, and therefore the base voltage so that the base current and voltage increase as the temperature falls and decrease as the temperature rises. This is accomplished by making the resistance of one of the resistors 13 or 14 or both, temperature sensitive so that the resistance thereof decreases with reduction in temperature and vice versa, increases with increase in temperature. Such a resistor is conventionally called a positive temperature coefficient resistor and referred to as a PTC resistor hereinafter.

The rate of change of the resistance of the PTC resistor is chosen so that the base current increases to meet the requirements of the transistors, due to the effect of the temperature on the transistor parameters. The temperature variation of $h_{FE(SAT)}$ for transistors depends on the characteristics of the transistor. It may be positive but non-linear. The variation of the $h_{FE(SAT)}$ over different temperature intervals may differ markedly. Ideally, I desire that the resistance of resistors for 13 and 14, vary so as to cause a base current which increases in value as the $h_{FE(SAT)}$ decrease or vice versa, sufficient to maintain saturation. The variation in the parameters of the transistors is, in most cases, much greater in going from 32° Fahrenheit to −300°, than in going from 32° Fahrenheit to +300° Fahrenheit. However, for many PTC resistors, the reverse is true for the temperature coefficient of resistance. The average rate of change of resistance in going from 32° to −320° is much less than in going from 32° to −300°. Thus, for example, the rate of change of resistance in going from 32° to 300° may be twice that in going from 32° to −300°.

In order to adjust temperature coefficient of resistance more closely to the temperature coefficient of the transistor parameters, I have modified the temperature coefficient of such PTC resistor so that it more closely matches the temperature coefficient of the transistor parameters. This may be accomplished by shunting the PTC resistor with a resistor which is substantially insensitive to temperature, as for example, a carbon resistor. The temperature coefficient of the parallel resistance circuit may thus be made to approach that required to compensate for the change in the transistor parameters.

The resistance of the parallel resistors at any temperature T above the temperature which $R_1$ and $R_2$ is measured, is given by the following formula:

$$\frac{R_1 \cdot R_2(1+BT)}{R_1+R_2(1+BT)}$$

In the above case, $R_1$ is the resistance of the resistor insensitive to temperature, for example, 13 and $R_2$, the resistance of a PTC resistor, for Example 14, having a temperature coefficient B over the temperature interval T from the temperature at which $R_2$ is measured. The total value of both resistors in parallel is chosen to obtain the saturation at the bases of 18 and 19, as described above, and the variation in the resistance of the parallel resistors 13 and 14, compensates for the change in $h_{FE(SAT)}$ and $V_{BE(SAT)}$. Thus, as the temperature decreases, causing a decrease in the value of $h_{FE(SAT)}$, and an increase in the value of $V_{BE(SAT)}$, the effective resistance of the parallel resistors 13 and 14 decreases sufficiently to satisfy the saturation requirements of the transistors, and to give the desired collector current as stated above.

A similar compensation for variations in the transistor parameters is shown in the modified circuit of FIG. 2. FIG. 2 is substantially the same as in FIG. 1, and all identical parts are similarly numbered, and the two circuits function in the same way. The variation is in the position of the resistors 13 and 14 which are not placed in parallel, but one in series with each of the poles of the supply D.C., and in series with each of the bases through the mid-point connection to the control secondary 15. A resistor 28 is placed in series with the base 19, and a resistor 29 is placed in series with the base 18. In this circuit, the $h_{FE(SAT)}$ is compensated by resistors 28 and 29 which, are PTC resistors, and the $V_{BE(SAT)}$ is compensated by the resistor 13 which is insensitive to changes in temperature, and resistor 14 which is a PTC resistor. Resistor 13 may in some cases, be omitted. As temperature falls, the resistors 28, 29 and 14 fall in resistance, causing an increase in the base current at 19 and 18, to compensate for the fall in $h_{FE(SAT)}$ and the increase in the value of $V_{BE(SAT)}$.

Figure 3:
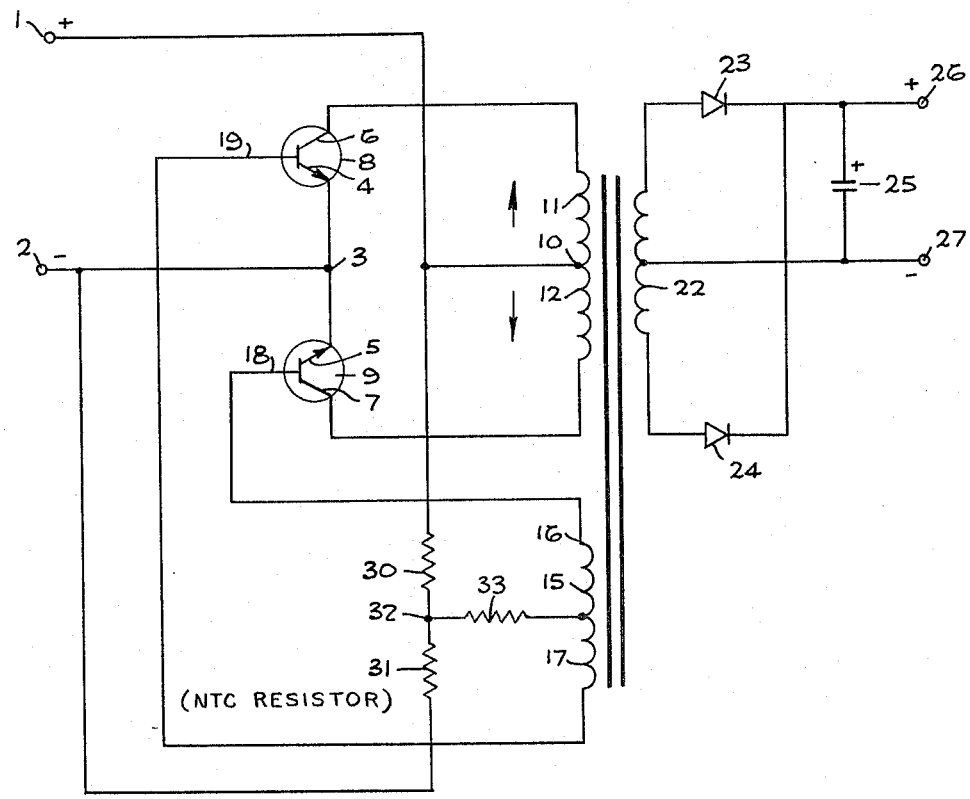

FIG. 3 shows a further modification of the circuit of FIG. 1 in which a thermistor 31 is employed. Thermistor 31 has a negative temperature coefficient of resistance. Thermistor 31 has a resistance which decreases as its temperature increases. Thermistor 31 is employed to cause an increase in the D.C. current to the bases of transistors 8 and 9 as ambient temperature decreases. Thermistor 31 is a negative temperature coefficient resistor which will be referred to hereinafter as an NTC resistor. NTC resistor 31 forms the lower leg of a voltage divider in series with the terminals 1 and 2. The upper leg of the voltage divider is a temperature insensitive resistor 30. The mid-point of the voltage divider 32 is connected to the midpoint of the control secondary 15, as in FIG. 1 through a resistor 33 which is temperature insensitive. The remainder of the circuit is the same as in FIG. 1. The voltage at 32 moves as temperature varies to change the resistance of 31, thus adjusting the current passing through 15. As the temperature decreases, the potential at 32 becomes more positive, increasing the current through resistor 33.

The variation in resistance of the thermistor 31, with change in temperature, may be modified if desired, by placing a temperature insensitive resistor in parallel or in series with resistor 31, or both may be employed. The resistor 31, as illustrated in FIG. 3, should be read as including the above additional resistances where their use is indicated to adjust the voltage change at 32 to compensate or minimize the changes in transistor parameters.

Where, in this specification, a temperature insensitive resistor is referred to, it will be understood to mean one having a low temperature coefficient of resistance such as is commonly referred to in this art as a temperature insensitive resistor.

In all of the above circuits, the width, that is the time interval or period of the positive and following negative pulses of the square wave, is dependent on the number of turns of the windings 11 and 12. If the number of turns are the same, the pulses will be of equal width. The pulse width of the positive and negative pulses will have a ratio proportional to the ratio of the turns in 11 and 12, and in this way, the characteristics of the pulse train can be adjusted by adjusting the ratio of the turns of 11 and 12.

Where, in the above description and drawings, polarities are indicated or stated, they are as shown for the NPN transistors. PNP transistors may be employed with the usual reverse in the polarities.

While I have described particular embodiments of my invention for the purpose of illustration, it should be understood that various modifications and adaptations thereof may be made within the spirit of the invention, as set forth in the appended claims.

I claim:

1. A D.C. to A.C. inverter comprising a pair of transistors connected in push-pull configuration, a saturable core transformer having a primary winding, a control secondary winding, and an output secondary winding, a pair of terminals adapted for connection, respectively, to the poles of a D.C. source, the emitters of said transistors being connected through a common connection to one of said terminals, the collectors of said transistors being connected to the primary winding of the saturable core transformer, the other of said terminals being connected to the midpoint of said primary winding and through a first resistor to an intermediate point in said control secondary winding, the bases of said transistors being connected in series with said control secondary winding and said resistor, whereby the D.C. applied to said terminals applies D.C. current to the said bases, and the induced A.C. in said control secondary winding alternately switches said transistors to "on" and "off" condition to develop a square wave in said output secondary, a second resistor connected to the said intermediate point of said primary winding and to the terminal connected to said emitters, and a third resistor connected in series with each base and said control secondary winding, said first and third resistors being positive temperature coefficient resistors, said second resistor having a resistance which does not change substantially as the temperature thereof changes.

2. A D.C. to A.C. inverter comprising a pair of transistors connected in push-pull configuration, a saturable core transformer having a primary winding, a control secondary winding, and an output secondary winding, a pair of terminals adapted for connection, respectively, to the poles of a D.C. source, the emitters of said transistors being connected through a common connection to one of said terminals, the collectors of said transistors being connected to the primary winding of the saturable core transformer, the other of said terminals being connected to the midpoint of said primary winding and through a first resistor to an intermediate point in said control secondary winding, the bases of said transistors being connected in series with said control secondary winding and said resistor, whereby the D.C. applied to said terminals applies D.C. current to the said bases, and the induced A.C. in said control secondary winding alternately switches said transistors to "on" and "off" condition to develop a square wave in said output secondary, a second resistor connected to the said intermediate point of said primary winding and to the terminal connected to said emitters, and a third resistor connected in series with each base and said control secondary winding, said first and third resistors being positive temperature coefficient resistors, said second resistor having a resistance which does not change substantially as the temperature thereof changes, each of said transistors having a collector circuit with a predetermined impedance in series therewith, the said impedance in one of said collector circuits being higher than the said impedance in the other of said collector circuits.

3. A D.C. to A.C. inverter comprising a pair of transistors connected in push-pull configuration, a saturable core transformer having a primary winding, a control secondary winding, and an output secondary winding, a pair of terminals adapted for connection, respectively, to the poles of a D.C. source, the emitters of said transistors being connected through a common connection to one of said terminals, the collectors of said transistors being connected to the primary winding of the saturable core transformer, the other of said terminals being connected to the midpoint of said primary winding and through a first resistor to an intermediate point in said control secondary winding, the bases of said transistors being connected in series with said control secondary winding and said resistor, whereby the D.C. applied to said terminals applies D.C. current to the said bases, and the induced A.C. in said control secondary winding alternately switches said transistors to "on" and "off" condition to develop a square wave in said output secondary, a second resistor connected to the said intermediate point of said primary winding and to the terminal connected to said emitters, and a third resistor connected in series with each base and said control secondary winding, said first and third resistors being positive temperature coefficient resistors, said second resistor having a resistance which does not change substantially as the temperature thereof changes, each of said transistors having a collector circuit with a predetermined impedance in series therewith, the said impedance in one of said collector circuits being higher than the said impedance in the other of said collector circuits, said primary winding having one portion thereof in series with the collector of one of said transistors, and the other portion thereof in series with the collector of the other of said transistors, said one portion of said primary winding having a D.C. resistance greater than the D.C. resistance of said other portion of the primary winding.

4. A temperature compensated transistor inverter for a direct-current source of potential having first and second output terminals, said inverter comprising: a pair of transistors connected in push-pull configuration, each of said transistors having a collector, an emitter and a base; a saturable core transformer having a primary winding, a control secondary winding and an output secondary winding, said primary winding and said control secondary winding each having an intermediate tap thereon; first and second input terminals for connection with said first and second output terminals, respectively, said first input terminal being connected to each of said emitters, one of said collectors being connected to one end of said primary winding, and the other of said collectors being connected to the other end of said primary winding, said second input terminal being connected to said tap on said primary winding, one of said bases being connected to one end of said control secondary winding, and the other of said bases being connected to the other end of said control secondary winding; and means including a temperature sensitive resistor connected from said second input terminal to said tap on said control secondary windings, thereby establishing a direct-current circuit with a transistor base to increase the current thereof when the ambient temperature decreases, the connections of said bases with the said ends of said control secondary winding being such that an alternating voltage induced in said control secondary winding alternately switches one of said transistors to cut off while the other is switched to saturation, and vice versa, to develop a square wave in said output secondary.

5. The invention as defined in claim 4 wherein said temperature sensitive resistor is a positive temperature coefficient resistor, said resistor being connected from said second input terminal to the said tap on said control secondary winding.

6. The invention as defined in claim 5, wherein a second resistor is provided, one side of said second resistor being connected to said tap on said control secondary winding and wherein the other side of said second resistor is connected to one of said input terminals.

7. The invention as defined in claim 6, wherein said other side of said second resistor is connected to said first input terminal.

8. The invention as defined in claim 7, wherein a fourth resistor connects one of said bases to one corresponding end of said control secondary winding, and a fifth resistor connects the other of said bases to the other corresponding end of said control secondary winding, said fourth and fifth resistors both being positive temperature coefficient resistors.

9. The invention as defined in claim 8, wherein said second resistor has a resistance insensitive to changes in temperature.

10. The invention as defined in claim 6, wherein said other side of said second resistor is connected to said second input terminal.

11. The invention as defined in claim 10, wherein said second resistor has a resistance insensitive to changes in temperature.

12. The invention as defined in claim 4, wherein said means includes second and third resistors, the resistances of said second and third resistors being insensitive to changes in temperature, said second resistor being connected from said second input terminal to one side of each of the other of said resistors, the other side of said temperature sensitive resistor being connected to said first input terminal, the other side of said third resistor being connected to the said tap on said control secondary winding, said temperature sensitive resistor being a negative temperature coefficient resistor.

13. A temperature compensated transistor inverter for a direct-current source of potential having first and second output terminals, said inverter comprising: a pair of transistors connected in push-pull configuration, each of said transistors having a collector, an emitter and a base; a saturable core transformer having a primary winding, a control secondary winding and an output secondary winding, said primary winding and said control secondary winding each having an intermediate tap thereon; first and second input terminals for connection with said first and second output terminals, respectively, said first input terminal being connected to each of said emitters, one of said collectors being connected to one end of said primary winding, and the other of said collectors being connected to the other end of said primary winding, said second input terminal being connected to said tap on said primary winding, one of said bases being connected to one end of said control secondary winding, and the other of said bases being connected to the other end of said control secondary winding; means connecting said emitters to the said intermediate tap on said control secondary winding, each of said transistors thus having a base circuit; and resistor means in said base circuit, said resistor means including a positive temperature coefficient resistor to increase base current when the ambient temperature decreases, said resistor means thereby establishing a direct-current circuit with a transistor base to increase the current thereof when the ambient temperature decreases, the connection of said transistor bases to the ends of said control secondary winding being such that an alternating voltage induced in said control secondary winding alternately switches one of said transistors to cut off while the other is switched to saturation and vice versa, to develop a square wave in said output secondary.

14. The invention as defined in claim 13, wherein said resistor means includes a positive temperature coefficient resistor connected in series from the base of one of said transistors to a corresponding end of said control secondary winding, and another positive temperature coefficient resistor connected from the base of the other of said transistors to the other corresponding end of said control secondary winding.

References Cited by the Examiner

UNITED STATES PATENTS

| | | | |
|---|---|---|---|
| 2,875,351 | 2/1959 | Collins | 331—113.1 |
| 3,029,398 | 4/1962 | McComb | 331—113.1 |
| 3,040,271 | 6/1962 | Murphy et al. | 331—113.1 |
| 3,101,454 | 8/1963 | Gossland | 331—109 |

OTHER REFERENCES

Pye, "High-Power Transistor D.C. Converters," Electronics & Radio Engineer, March 1959, pages 96–104.

ROY LAKE, *Primary Examiner.*

S. H. GRIMM, *Assistant Examiner.*